United States Patent [19]

Kondo et al.

[11] 4,420,543
[45] Dec. 13, 1983

[54] BEARING MEMBER OF AN INTERNAL COMBUSTION ENGINE, HAVING A FLAME SPRAYED SURFACE

[75] Inventors: Katsumi Kondo; Yoshio Fuwa, both of Toyota; Akira Harayama; Toru Nakahora, both of Okaya, all of Japan

[73] Assignees: Toyota Jidosha Kogyo Kabushiki Kaisha, Toyota; Teikoku Piston Ring Co., Ltd., Tokyo, both of Japan

[21] Appl. No.: 203,603

[22] Filed: Nov. 3, 1980

[30] Foreign Application Priority Data

Nov. 9, 1979 [JP] Japan .............................. 54-145138

[51] Int. Cl.$^3$ .......................... B22F 7/34; B22F 7/08; F16J 9/00
[52] U.S. Cl. .................................... 428/564; 75/252; 75/255; 277/224; 277/235 A; 427/423; 428/565
[58] Field of Search ............... 428/569, 565, 682, 564; 75/252, 255; 427/423; 277/224, 235 A

[56] References Cited

U.S. PATENT DOCUMENTS

| | | | |
|---|---|---|---|
| 3,322,546 | 5/1967 | Tanzman et al. | 427/423 X |
| 3,606,359 | 9/1971 | McCormick | 277/224 |
| 3,690,686 | 9/1972 | Prasse et al. | 277/235 A |
| 3,814,447 | 6/1974 | Prasse et al. | 277/224 |
| 3,819,384 | 6/1974 | Ingham et al. | 75/255 |
| 3,938,814 | 2/1976 | Cromwell | 277/235 A |
| 4,101,319 | 7/1978 | Beyer et al. | 75/252 |
| 4,161,321 | 7/1979 | Hendrixon et al. | 277/216 |
| 4,251,599 | 2/1981 | McCormick | 75/255 X |
| 4,323,257 | 4/1982 | Kondo et al. | 277/224 |

FOREIGN PATENT DOCUMENTS 54-126854 10/1979 Japan .................................. 277/224

OTHER PUBLICATIONS

Japanese publication entitled "Piston Ring", published by Nikkan Kogyo Shinbunsha, Jul. 10, 1970 (text in Japanese).
Japanese publication entitled "Metal Surface Technical Handbook", published by Nikkan Kogyo Shinbunsha, Jun. 15, 1963 (text in Japanese).
H. Sunden and R. Schaub, *Piston Rings for Slow and Medium Speed Diesel Engines*, Tribology International, Feb. 1979, pp. 3-14.
Herbert F. Prasse et al., *Heavy Duty Piston Rings*, 1968, Society of Automotive Engineers, Feb. 15, 1968, pp. 1-19.
JIS Handbook 1978 Ferrous Materials and Metallurgy, Japanese Standards Association, Tokyo, Japan (pp. 7, 356-358).
JIS Handbook 1978 Non-Ferrous Metals and Metallurgy, Japanese Standards Association, Tokyo, Japan (pp. 11, 791-794).
McGannon, The Making, Shaping and Treating of Steel-9th Edition, United States Steel Corporation (pp. ix, 256-260).
Merriman, A Dictionary of Metallurgy, MacDonald & Evans, Ltd., London, Great Britain, 1958 (p. 91).
Birchon, Concise Encyclopedic Dictionary of Metallurgy, Elsevier Publishing Co., Amsterdam, Netherlands (pp. 144-145).

*Primary Examiner*—Mark Bell
*Attorney, Agent, or Firm*—Benasutti and Murray

[57] ABSTRACT

In a bearing member of an internal combustion engine, having a flame sprayed surface, molybdenum or tungsten carbide is known as the material of the flame spray. The present invention aims to provide, for example a flame-sprayed piston ring with good heat-and-wear-resistance as well as a property of not seriously wearing the engine cylinder or cylinder liner. The flame sprayed layer of the present invention is composed of mainly ferrochrome powder and plus a powder of a self fluxing alloy, and additionally molybdenum. The piston ring of the present invention is suitable for heavy duty internal combustion engines, in which wear of the piston ring and cylinder are severe.

12 Claims, 2 Drawing Figures

BEARING MEMBER OF AN INTERNAL COMBUSTION ENGINE, HAVING A FLAME SPRAYED SURFACE

The present invention relates to a bearing member for an internal combustion engine, and, more particularly, to an improvement of the bearing surface of the bearing member, such as a piston ring and a cylinder liner, which is required to possess resistance against scuff, scoring and wear.

An internal combustion engine is recently liable to be operated under a higher load due to the tendency of reducing the weight of the internal combustion engine and increasing the power of the internal combustion engine. This increases the requisite level of the scuffing resistance and the wear resistance with regard to the piston ring, cylinder liner and the like, of which the internal combustion engine is composed. A chromium plating has, therefore, conventionally been applied on the surface of the metal base of the piston ring and the like, so as to fulfill the requirements with regard to several types of internal combustion engines. The chromium plating has, however, a heat resisting property which is not satisfactory for several heavy-duty type engines, with the result that scuffing between the bearing members occurs. A flame sprayed molybdenum material has been used for several heavy-duty type engines in substitution for the chromium plating. The flame sprayed molybdenum provides a good scuffing resistance, but is slightly inferior to the chromium plating with regard to wear resistance. In addition, the raw materials of the molybdenum flame-spray are expensive due to limited natural resources, which evidently sets a limit to widely utilizing the molybdenum flame-spray for the internal combustion engines.

A high grade flame-spraying material, mainly composed of tungsten carbide or other high melting point- and hard-materials, is proposed in a few pieces of literature, but has not been used for commercial internal combustion engines. The high-grade flame-spraying material applied on a piston ring provides the piston ring with an extremely high wear resistance, but disadvantageously exposes the mating member, i.e. the cylinder liner, to high wear by the piston ring. Therefore, the high-grade flame-spraying material is not satisfactory in the light of the length of the life of both bearing members which slide with each other. The length of life is hereinafter referred to as the relative life. Such disadvantageously high wear of the cylinder liner can be mitigated by use of a special cast iron, e.g. a molybdenum alloyed cast iron, for the cylinder liner. However, in the liner-less type internal combustion engines, in which the cylinder block is comprised of normal cast iron, such as FC 20 or FC 30 (JIS grades of a gray cast iron), the cylinder block wear due to the piston ring is extremely high. It is, therefore, of crucial importance in the bearing members of an internal combustion engine to select a flame-spraying material, applied on one of the bearing members, in such a manner not only to provide said one member with a good wear resistance but also to cause no serious wear of the other member, i.e. the mating member.

It is an object of the present invention to remove the disadvantages mentioned above and to provide a bearing member of an internal combustion engine which possesses good resistance against heat, wear and scuffing and which does not seriously wear the mating bearing member.

In accordance with the object of the present invention, there is provided a bearing member of an internal combustion engine having a bearing face coated with a flame sprayed material, characterized in that the flame sprayed layer applied on the bearing surface is composed mainly of a ferrochrome and additionally of a self fluxing alloy. The flame sprayed layer may further contain molybdenum as an additional component thereof.

Generally speaking, the porosity of the flame sprayed layer retains a lubricant the surface of such a layer and is desirable for the scuffing resistance of a bearing member. The properties of the flame sprayed layer, other than the porosity, determine the wear resistance of a bearing member and the wear of the mating bearing member. When the flame sprayed layer applied on a bearing member is mainly composed of molybdenum, the wear resistance of this layer is low, as described above, which is due to the material property of metallic molybdenum. On the other hand, when the flame sprayed layer applied on a bearing member is mainly composed of a hard metal, the bonding between the flame sprayed particles may be weakened, depending upon the kinds of the flame sprayed materials and the particle size, with the result that the particles peel off from the surface of the flame sprayed layer during finishing, such as grinding, lapping and the like of the flame-sprayed bearing member. Therefore, the particles on the surface of the flame sprayed layer tend to be sharp edged. This tendency is high, when the flame sprayed material has a high hardness and contains materials having an excellent wear resistance, but which are difficult to work, such as chromium carbide ($CrC_2$) and tungsten carbide (WC).

Even if the surface of a piston ring having sharp edged particles displayed no scuffing such a piston ring excessively wore the engine-cylinder at the initial wearing stage. This led the inventors to the discovery that not only the material of the bearing face but also the micro-structure of the components of the bearing face are important for the bearing member, which is required to have a good heat- and wear-resistance and a long relative life in an internal combustion engine and which is finished by grinding, lapping and the like. The present invention utilizes, therefore, ferrochrome as one of the components of the flame sprayed layer and provides the flame sprayed layer with resistance against wear and heat, particularly at high temperatures superior to those of the flame sprayed molybdenum and also with a smaller wearing tendency of the mating material than that of the flame sprayed chromium carbide. The present invention utilizes as the other component a self fluxing alloy. The ferrochrome particles are therefore dispersed within and retained by the self fluxing alloy powders, with the result that the bonding strength the individuals particles and the bonding strength between the particles and the metal base are higher than a bearing face with the flame sprayed ferrochrome. In addition, the flame sprayed layer of the present invention displays a good workability and a low tendency of wearing the mating material.

It is to be expected, because of a high bonding strength of the particles, that the flame sprayed particles of the present invention tend to peel less from the bearing member during the working and sliding of the bearing member than the flame sprayed particles of ferrochrome alone. This can contribute to the enhancement of the heat- and wear-resistance and the relative life. The grain size of the flame-spraying material, the size of pores in the flame sprayed layer and the porosity should be selected in light of the bonding strength. The size of the pores is preferably 0.2 mm at the largest and the porosity (the surface porosity after lapping) is preferably from 10 to 40%.

Several kinds of ferrochrome, from a high carbon ferrochrome to a low carbon ferrochrome, are available in the market. Carbon of the ferrochrome is oxidized and decreased during the flame spraying, particularly a plasma arc spraying. The carbon content of ferrochrome is preferably not less than 3.0%, so as to provide the flame sprayed layer with a satisfactorily high wear resistance, not withstanding the oxidation and decrease of carbon. The ferrochrome herein means an alloy, in which the major parts are composed of iron, chromium and carbon.

The self fluxing alloy according to the present invention contains a self fluxing component, which is usually at least one selected from the group consisting of boron and silicon, and a metallic component, which is at least one selected from the group consisting of nickel, chromium, cobalt and molybdenum. The metalic component is preferably nickel alone, both nickel and chromium, or combinations of cobalt, nickel, chromium and molybdenum. The self fluxing alloy may further contain iron as an additional metallic component, in addition to the major metallic components, such as nickel and chromium, mentioned above, in an amount of up to 30% by weight based on the total metallic components. The nickel, chromium, cobalt and molybdenum have generally a good resistance against heat and oxidation and enhance the heat resistance of the bearing member as compared with that in which the ferrochrome is flame sprayed alone. These metals, hereinafter referred to as refractory metal, seem to be present in the flame sprayed layer in a metallic state and seem to fuse, due to the presence of the self fluxing component, and then solidify in the particle form. This is believed to contribute to a considerably uniform dispersion and firm retention of the ferrochrome particles. In this regard, the refractory metals have a fine solidification structure and a good wetting property of the ferrochrome particles. These properties seem to be desirable for enhacing the dispersion and retention function of the refractory metals. Nickel alone and both nickel and chromium provide an excellent dispersion-and-retention property of the ferrochrome particles and workability of the flame sprayed layer.

The flame sprayed layer according to the present invention is composed of the ferrochrome and the self fluxing alloy, as stated above, and the proportions of the components of the flame sprayed layer are determined as described hereinafter.

The amount of ferrochrome, which is mainly responsible for the wear resistance of the flame sprayed layer and which is firmly adhered to the metal base of a piston ring made of cast iron or steel, should be not lower than 55%, so as to obtain the desired wear resistance. When the amount of the ferrochrome exceeds 90%, a phenomenon which indicates a gradual increase of the engine-cylinder wear is observed in the operation of especially a gasoline engine without a liner. The ferrochrome content is preferably in the range of from 55 to 90% and more preferably in the range of from 60 to 85%.

The excellent properties of a self fluxing alloy, that is, resistance against oxidation, wear and corrosion, adhesion with the metal base and workability, are maintained in the bearing face. The self fluxing alloy is one of the components of the flame sprayed layer, uniformly dispersing the ferrochrome particles and enhacing the bonding strength between the particles of the flame sprayed layer. More in detail, a fine dispersion of the ferrochrome particles in the particles of the self fluxing alloy takes place, when the powder mixture of the ferrochrome and self fluxing alloy is flame splayed, then these powders, in a finely divided form, are applied on the metal base in the form of a uniform laminate. The bonding of the ferrochrome-and self fluxing alloy-particles is, therefore, stronger than the bonding of the ferrochrome particles alone, due to the fine dispersion. Thus, the flame sprayed particles are not liable to peel off during the surface finishing of the flame sprayed layer, and therefore a smooth surface is obtained after the working. In addition, the self fluxing alloy prevents the deterioration of the flame sprayed layer exposed to the high temperature oxidation- and corrosion- atomsphere, because the self fluxing alloy makes this layer oxidation- and corrosion-resistant due to its inherent properties and also makes this layer dense due to the combination of the self fluxing alloy particles with the ferrochrome particles. When the amount of the self fluxing alloy is less than 10%, the merits explained above are not realized. The flame sprayed layer on a piston ring with less than 10% of the self fluxing alloy has not only none of the merits explained above, but also adversely wears the engine cylinder. When the amount of the self fluxing alloy exceeds 45%, the amount of ferrochrome becomes too small to provide the piston ring with a desired wear resistance. The amount of the self fluxing alloy is therefore appropriately from 10 to 45%. A preferable amount of the self fluxing alloy is from 15 to 40%

The flame spray of the mixture of the ferrochrome and self fluxing alloy considerably improves both wear characteristic of a piston ring, on which the flame spray is applied, and wear characteristic of an engine cylinder, which is in a frictional sliding engagement with the piston ring, over those of the conventional bearing member and those of a bearing member with the flame sprayed layer of ferrochrome alone. However, the flame spray of the mixture of ferrochrome, self fluxing alloy and molybdenum furthermore improves the relative life of the bearing members.

Molybdenum has been used in several heavy duty types of internal combustion engines as a flame sprayed layer of bearing members and displayed notable resistance against scuffing. However, the flame sprayed layer of molybdenum alone has a short-coming in its wear resistance is inferior to the chromium plating, and is therefore not as widely used as the chromium plating. When not just molybdenum alone but the powder mixture of ferrochrome, molybdenum and self fluxing alloy is flame sprayed, the ferrochrome and molybdenum particles are uniformly dispersed in the self fluxing alloy particles. These particles are in the form of a uniform laminate. As described above, the self fluxing alloy itself can contain molybdenum. However, when the molybdenum particles are dispersed in the flame sprayed layer separately from the self fluxing alloy and realizes a further enhancement of the wear resistance, particularly the relative life, and simultaneously achieves a good scuffing resistance which is an inherent characteristic of the molybdenum. When the amount of molybdenum is less than 5%, the scuffing resistance is low and the relative life is not effectively prolonged by the molybdenum addition. Since molybdenum is easily oxidizable at high temperature, molybdenum in an amount exceeding 15% can disadvantageously accelerate an oxidation wear of the flame sprayed layer. The amount of molybdenum is therefore preferably from 5 to 15%. When the molybdenum amount ranges from 5 to 15%, the ferrochrome and the self fluxing alloy should be from 55 to 85% and from 10 to 30%, respectively.

The present invention is described hereinafter with reference to the drawings, in which.

Figure 1:
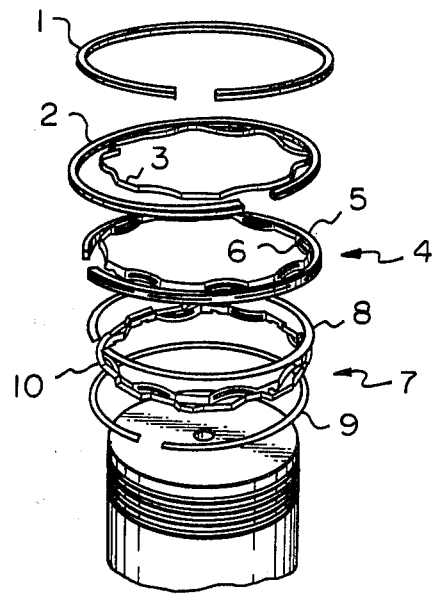
FIG. 1 is a disassembled view of piston rings.

Referring to FIG. 1, the piston rings of a known configuration are illustrated in a disassembled state from the grooves of a piston of an internal combustion engine. The top compression ring is denoted by reference numeral 1, and the second compression ring is denoted by the reference numeral 2 and is outwardly expanded by an expander ring 3. The piston rings of an internal combustion engine usually include, in addition to the compression rings for preventing, a gas leakage and in the combustion pressure, oil-control rings which scrape excess lubricating oil from the cylinder wall. The oil control rings are collectively denoted in FIG. 1 by reference numerals 4 and 7. The upper oil-control ring assembly 4 comprises the upper oil-control ring 5 and the expander ring 6. The upper oil-control ring 5 may be one-piece cast-iron oil control ring. The lower oil-control assembly 7 comprises upper and lower rails 8 and 9, respectively, made of steel, and an expander spring 10. The flame sprayed layer according to the present invention may be applied on one or more of the top compression ring, the second compression ring, the supper oil-control ring 5, the upper rail 8 and the lower rail 9. The surface of the top compression ring and the like, the flame sprayed layer is applied on the surface portion which is in an operational engagement with the cylinder wall. However, the surface portion other than that mentioned above, such as a ring side, may additionally be provided with the flame sprayed layer of the present invention.

Examples of the present invention will be explained later.

Figure 2:
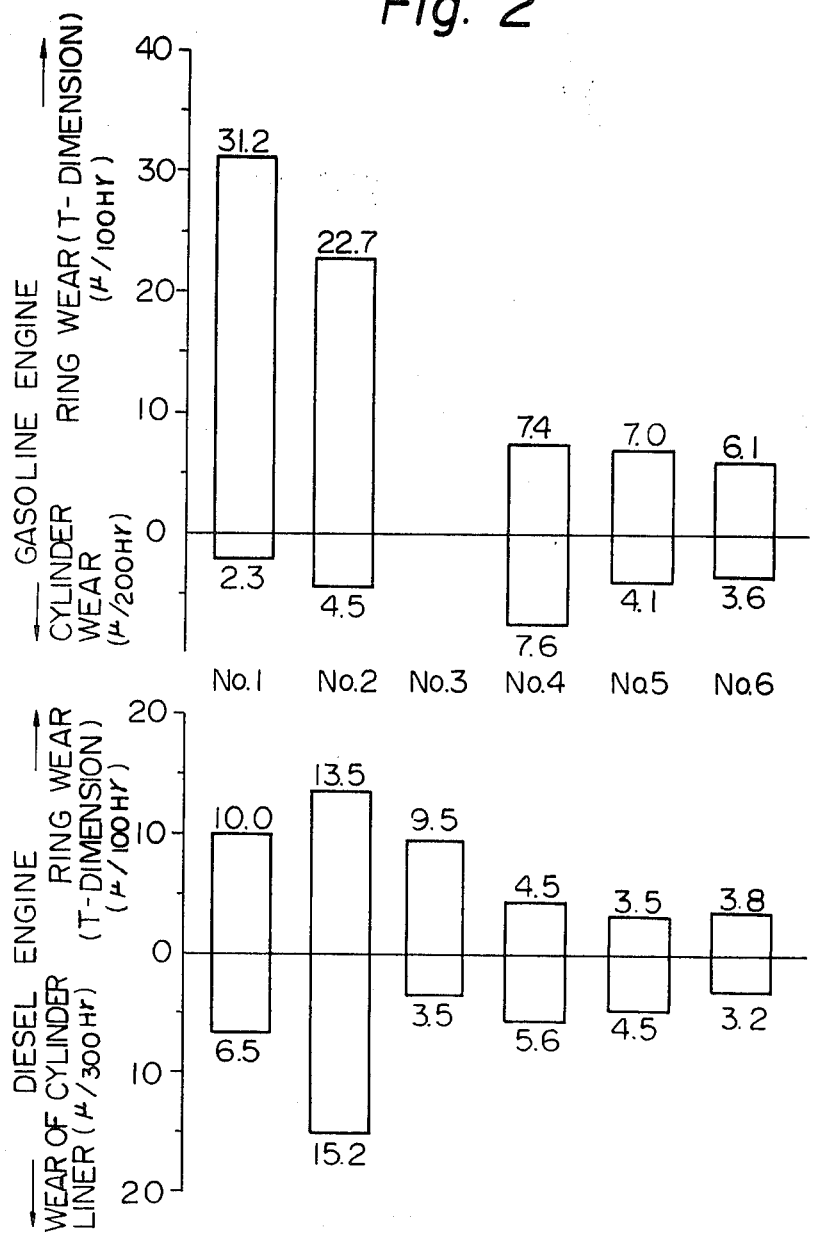
FIG. 2 is graph indicating the piston ring wear and the cylinder (liner) wear of liner-less gasoline engine and Diesel engines fitted with several types of piston rings denoted by Nos. 1 through 6.

In these Examples, the piston rings with the flame sprayed layer according to the present invention were mounted in internal combustion engines, and the piston rings subjected to various surface treatment were tested for the purpose of comparison with the present invention. The radial wear amount (T dimension) of the piston rings and the maximum wear amount of the engine cylinder or the cylinder liner at the top dead center of the piston rings was measured. The internal combustion engine in the first Example was a liner less gasoline engine, while the internal combustion engine in the second example was a Diesel engine. The top ring of these engines was subjected to a predetermined surface treatment. The engine operation was carried out over a period of 200 hours with regard to the gasoline engine and over a period of 300 hours with regard to the Diesel engine, and then wear amounts were measured. The wear amount of the piston rings is illustrated in FIG. 2 as amounts reduced to those of 100 hours.

Kinds of the surface treatment carried out are give in Tables 1 and 2.

TABLE 1

| Engine | Test | Cylinder Nos. 1 | 2 | 3 | 4 |
|---|---|---|---|---|---|
| Gasoline Engine | First | Chromium plating (Control) | Molybdenum (Wire flame Spraying) (Control) | Ferrochrome (100%) (Control) | Ferrochrome (70%) Self Fluxing Alloy (30%) (Invention) |
| | Second | Molybdenum (Wire flame Spraying) (Control) | Ferrochrome (100%) (Control) | Ferrochrome (70%) Self Fluxing Alloy (20%) Molybdenum (10%) (Invention) | The same as above (Invention) |

TABLE 2

| Engine | Test | Cylinder Nos. 1 | 2 | 3 | 4 |
|---|---|---|---|---|---|
| Diesel Engine | First | Chromium plating (Control) | Molybdenum (Wire Flame Spraying) (Control) | Ferrochrome (100%) (Control) | Ferrochrome (70%) Self Fluxing Alloy (30%) (Invention) |
| | Second | Molybdenum (Wire Flame Spraying) (Control) | Molybdenum (75%)* Self Fluxing Alloy (25%) (Control) | Ferrochrome (70%) Self Fluxing Alloy (20%) Molybdenum (10%) (Invention) | The same as above (Invention) |

The molybdenum sprayed piston rings were control piston rings and produced by a flame spray using molybdenum wire. The flame sprayed layer on the bearing surface of the other piston rings of the present invention and control samples were prepared by using a plasma spray device of METECO 3M type. The composition and grain size of the flame sprayed powder were as follows.

Ferrochrome (JIS G2303 FCrH3) Cr 68.57%; C 6.61%; Si 0.19%, and Fe the balance. Grain size-finer than 250 mesh.

A self fluxing alloy (JIS H8303 MSFNi5): Cr 17%; B 3.5%; Si 3.5%, C 0.7%; Fe 3%, and; Ni the balance. Grain size-finer than 250 mesh.

Molybdenum having purity at least 99% and the grain size of which was finer than 150 mesh was used except for the asterisk marked Mo in Table 2. The asterisk marked molybdenum was commercial powder having a composition of: Mo 75%, Cr 4.25%; B 0.8%; Si 1.0%; C 0.2%; Fe 1.0%, and Ni the balance.

In FIG. 1 the meaning of Nos. 1 through 6 is as follows.

No. 1-Chromium plating (control)
No. 2-Flame sprayed Mo wire (control)
No. 3-Flame sprayed mixture of 75% molybdenum and 25% nickel-self fluxing alloy (control)
No. 4-Flame sprayed ferrochrome (control)
No. 5-Flame sprayed mixture of 70% ferrochrome and 30% self fluxing alloy (invention)
No. 6-Flame sprayed mixture of 70% ferrochrome, 20% self fluxing alloy and 10% molybdenum (invention)

Example 1

The test piston rings given in Table 1 were mounted in a gasoline engine for an automobile, having the following properties:

85 mm $\phi$ (inner diameter)×78 mm (stroke)×4 cylinders;

total displacements of 1770 cc;

the maximum power of 98PS/5700 rpm;

cylinder material gray cast iron similar to JIS FC25, and;

fuel-gasoline with 3.2 gr of Pb per U.S. gal.

The piston rings were tested under 5700 rpm and full loads of the gasoline engine. The test results are illustrated in FIG. 2.

Since the No. 2 and 5 piston rings were tested twice, the average wear amounts are given in FIG. 2.

Referring to the upper half of FIG. 2, the ring wear of the piston rings of the present invention is from approximately one fourth to one fifth as compared with that of the chromium plated piston ring, while the ring wear of the piston rings of the present invention is approximately one third of that of the molybdenum flame-sprayed piston ring. The wear amount of the cylinder bore (the bore wear) caused by the piston rings of the present invention is from approximately 1.5 times to twice that caused by the chromium plated ring and is from approximately 0.7 to 0.8 times that caused by the Mo flame-sprayed piston ring. Therefore, the ring wear is drastically reduced by the present invention, however, the bore wear of the present invention is increased as compared with the chromium plated piston ring and is slightly decreased as compared with the molybdenum flame-sprayed piston ring. However, the relative life of the piston rings according to the present invention is remarkably superior to that of both the chromium plated and molybdenum flame-sprayed piston rings.

Although not proven in the tests, the considerably great ring wear of the chromium plated piston ring supposedly exerts an unfavourable influence on the wear of cylinder bore when the engine is operated longer than the test operation period. In this regard, the piston rings of the present invention mounted in the gasoline engine will not display abnormally great wear of either the piston ring or the engine cylinder and have therefore an excellent relative life span.

Example 2

The test piston rings given in Table 2 were mounted in a Diesel engine for an automobile, having the following properties:

91 mm $\phi$ (bore diameter)×86 mm (stroke)×4 cylinders;

a total displacements of 2188 cc;

a maximum power of 72 PS/4200 rpm, and;

the cylinder liner made of a wear resistant special cast iron (C 3.2%, Si 2.2%, Mn 0.7%, P 0.25%, S 0.05%, Cr 0.22% Nb 0.2% and Fe the balance).

The piston rings were tested under 4400–4800 rpm and a total load of the Diesel engine.

Referring to the lower half of FIG. 2, the ring wear of the piston rings of the present invention is from approximately 1/2.5 to ⅓ times less when compared with that of the chromium plated piston ring and, the molybdenum flame-sprayed piston ring. The amount of the cylinder liner wear caused by the piston rings of the present invention is approximately from a half to 0.7 times that caused on the chromium plated piston ring, and is from approximately one fifth to 0.3 times that caused on the Mo flame-sprayed piston ring. Therefore, the ring wear and the cyliner liner wear are reduced by the present invention, and the ring wear reduction is superior as compared with the chromium plated and molybdenum flame-sprayed piston rings.

When the piston rings of the present invention are compared with the piston rings having a flame sprayed layer of ferrochrome alone (No. 4), it is apparent that the ring wear and the cylinder liner wear in the former piston rings was approximately 80% and from approximately 60 to 80% those of the latter piston ring. This difference in the wear amounts is not as distinct as that in Example 1 (c.f. Nos. 4, 5 and 6 in the upper half of FIG. 1). Such a small difference in the present Example is attributable to the material of cylinder liner, that is, wear resistant special cast iron. It will also be apparent from this Example that the relative life span of the piston rings according to the present Example is superior to conventional piston rings.

We claim:

1. A bearing face coated with a flame sprayed material for use in an internal combustion engine, characterized in that the flame sprayed layer applied on the bearing face is composed of from 55 to 90% of ferrochrome and from 10 to 45% of a self-fluxing alloy.

2. A bearing face according to claim 1, wherein said self-fluxing alloy contains at least one metallic component selected from the group consisting of nickel, chromium, cobalt and molybdenum.

3. A bearing face according to claim 2, wherein said metallic component is both nickel and chromium.

4. A bearing face according to claim 2, wherein said metallic component is nickel.

5. A bearing face according to claim 1, wherein the proportions of said ferrochrome and said self fluxing alloy in said flame sprayed layer are from 60 to 85% and from 15 to 40%, respectively.

6. A bearing face coated with a flame sprayed material for use in an internal combustion engine, characterized in that the flame sprayed layer applied on the bearing face is composed of from 55 to 85% of ferrochrome, from 10 to 30% of self-fluxing alloy, and from 5 to 15% of molybdenum.

7. A bearing face according to claim 6, wherein said self-fluxing alloy contains at least one metallic component selected from the group consisting of nickel, chromium, cobalt and molybdenum.

8. A bearing face according to claim 6, wherein said metallic component is both nickel and chromium.

9. A bearing face according to claim 1, wherein the ferrochrome particles are dispersed uniformly within the self-fluxing alloy particles.

10. A bearing face according to claim 6, wherein the molybdenum particles and ferrochrome particles are dispersed uniformly within the self-fluxing alloy particles.

11. A bearing member of an internal-combustion engine possessing a good resistance to heat, wear, and scuffing; which does not seriously wear a mating member; and having a bearing face coated with a flame sprayed material, the flame sprayed layer on the bearing face being composed of self-fluxing alloy particles and particles of ferrochrome dispersed uniformly within and retained by the self-fluxing alloy particles, and the amount of ferrochrome particles and the amount of self-fluxing alloy particles being from 55% to 90% and from 10% to 45%, respectively, based on the weight of said flame sprayed layer.

12. A bearing member of an internal-combustion engine possessing a good resistance to heat, wear, and scuffing; which does not seriously wear a mating member; and having a bearing face coated with a flame sprayed material, the flame sprayed layer on the bearing face being composed of molybdenum particles, self-fluxing alloy particles, and particles of ferrochrome, the molybdenum particles and the ferrochrome particles being dispersed uniformly within and retained by the self-fluxing alloy particles, and the amounts of the component particles being approximately, based on the weight of the flame sprayed layer, (a) ferrochrome particles: from 55% to 85%;
(b) self-fluxing alloy particles: from 10% to 30%; and
(c) molybdenum particles: from 5% to 15%.

* * * * *